US006643116B2

(12) United States Patent
Nolte

(10) Patent No.: US 6,643,116 B2
(45) Date of Patent: Nov. 4, 2003

(54) RADIO FREQUENCY (RF) SECURITY ELEMENT, COIL AND CAPACITOR FOR AN RF-SECURITY ELEMENT AND METHOD FOR PRODUCTION THEREOF

(75) Inventor: Rainer Nolte, Waldsolms (DE)

(73) Assignee: Checkpoint Systems International GmbH, Hirshhorn/Neckar (DE)

(*) Notice: Subject to any disclaimer, the term of this patent is extended or adjusted under 35 U.S.C. 154(b) by 0 days.

(21) Appl. No.: 10/288,612

(22) Filed: Nov. 5, 2002

(65) Prior Publication Data

US 2003/0089513 A1 May 15, 2003

Related U.S. Application Data

(63) Continuation of application No. PCT/EP01/04738, filed on Apr. 26, 2001.

(30) Foreign Application Priority Data

May 5, 2000 (DE) ........................................ 100 21 977

(51) Int. Cl.[7] ................................................ H01G 4/32
(52) U.S. Cl. ...................... 361/301.5; 29/25.41; 36/329
(58) Field of Search ........................... 361/301.1, 301.3, 361/301.5, 306.3, 511, 329; 29/25.41, 25.42

(56) References Cited

U.S. PATENT DOCUMENTS 3,680,207 A * 8/1972 Belmonte et al. ............. 29/611

FOREIGN PATENT DOCUMENTS

| | | |
|---|---|---|
| DE | 29 27 866 A1 | 1/1981 |
| DE | 33 37 787 A1 | 4/1985 |
| DE | 37 29 031 A | 3/1989 |
| EP | 0 136 265 A1 | 4/1985 |

* cited by examiner

*Primary Examiner*—Anthony Dinkins
(74) *Attorney, Agent, or Firm*—Akin Gump Strauss Hauer & Feld, L.L.P.

(57) ABSTRACT

An RF security element has a capacitor (8) and a spiral-wound coil (4) with at least two windings (6), in which the coil has at least one winding of straight wire (12) and at least one winding of undulated wire (14). The coil is produced by alternately winding at least one turn of straight wire (12) and at least one turn of undulated wire (14) onto a winding spindle (22), with the undulated wire being formed by passing a portion of straight wire (12) through at least two mating gears (26). The capacitor (8) is produced by inter-twining first and second pieces of wire (16, 18) on the two ends of the coil (4).

20 Claims, 3 Drawing Sheets

RADIO FREQUENCY (RF) SECURITY ELEMENT, COIL AND CAPACITOR FOR AN RF-SECURITY ELEMENT AND METHOD FOR PRODUCTION THEREOF

CROSS-REFERENCE TO RELATED APPLICATIONS

This application is a continuation of International Application No. PCT/EP01/04738, filed Apr. 26 2001, the disclosure of which is incorporated herein by reference.

BACKGROUND OF THE INVENTION

This invention relates to a coil and to a capacitor for a radio frequency (RF) security element with a capacitor and with a spiral-wound coil having several windings; and further to a method for production of a coil and of a capacitor for an RF security element.

RF security elements are comprised of a resonant circuit with a coil and a capacitor. There is a vast variety of RF security element designs, such as those embodied as self-adhesive labels, as tags or so-called "hard tags." These hard tags are made up of a resonant circuit enclosed in a sturdy casing that is in turn so firmly attached to the article to be protected that a potential shoplifter can not remove it. If the article is properly paid for, a hard tag of this nature is detached from the article, and the buyer can leave the store unhindered. Surveillance zones containing an alternating magnetic field are usually set up in the exit area of stores. If an article with a hard tag still attached to it reaches the surveillance zone, the resonant circuit of the hard tag is excited by the alternating magnetic field to emit a characteristic recognition signal. The alarm is triggered as soon as the surveillance system registers this recognition signal.

For the highest possible detection rate the resonant frequency setting of the resonant circuit in the hard tag must be very precise. On the other hand, hard tags are auxiliary devices that should be available at the lowest possible cost.

BRIEF SUMMARY OF THE INVENTION

The object of the invention is to provide an RF security element which has a resonant frequency that can be set with low tolerances, and which can be produced at low cost.

This object is achieved in accordance with the invention by a coil for an RF security element with a capacitor and with a spiral-wound coil having several windings, in which windings of straight wire and windings of undulated wire are provided, preferably alternating with one another. The mean distance between adjacent windings is very large due to the preferable alternation of one winding with straight wire and one with undulated wire. Thus, the coil has a low capacitance and is of correspondingly high quality factor or Q factor. Furthermore, the coil according to the invention is easy and inexpensive to produce, since fewer demands are made on the wire used. This is why, for example, it is not necessary to use the PVC or silk insulation ordinarily used for high-quality coils. This substantially lowers the cost of the wire.

In a further development of the invention the wave valleys and peaks of the undulated windings touch the adjacent windings of straight wire or are arranged in their direct vicinity, so that the space required for the coil stays as small as possible in spite of a large mean distance between neighboring windings of the coil. Furthermore, spatial displacements of the windings relative to one another are prevented, for which reason the electrical properties of the resonant circuit are also stable.

In other embodiments the undulated wire is provided in the shape of half-waves of a triangular, sine half-wave or semicircular shape. This permits the production of the undulated wire to be as simple as possible.

In one embodiment of the invention, each winding of straight wire and each winding of undulated wire encloses an angle of $2\pi$. Therefore, the coil according to the invention is of especially low capacitance.

A variant of the invention provides for the coil to be produced from baked-enamel wire, so that the material costs for production of the coil can be drastically reduced as opposed to the known spiral-wound coil with PVC or silk insulation.

The object given above is also achieved by a capacitor for an RF security element with a spiral-wound coil having several windings and with a capacitor, in which the capacitor comprises a first piece of wire and a second piece of wire, the first and the second wire pieces being intertwined. In this manner, expensive commercially available capacitors are replaced with two pieces of wire.

In a further development of the invention the first piece of wire or the second piece of wire is wound about the respective other piece of wire. This simplifies the twisting and lowers the production costs.

In another embodiment the first piece of wire comprises the one end of the coil wire and the second piece of wire comprises the other end of the coil wire. Thus, the entire resonant circuit can be produced from one piece of wire, and it becomes unnecessary to join together the coil and the capacitor. This further reduces the production costs.

In a further development of the invention the capacitor is made of baked-enamel wire. This permits the material costs for the capacitor according to the invention to be kept low.

The object given above is also achieved by an RF security element with a spiral-wound coil having several windings and with a capacitor, in which the coil is a coil according to one or more of the disclosed embodiments of the invention or equivalents thereof, and in which the capacitor is a capacitor according to one or more of the disclosed embodiments of the invention or equivalents thereof. This combines within one RF security element the advantages not only of the coil according to the invention, but also of the capacitor according to the invention.

The object given above is further achieved by a method for production of a spiral-wound coil of an RF security element in which a winding of straight wire and a winding of undulated wire, preferably alternating, are wound about a winding spindle. A coil according to the invention can be produced by this method, which results in the advantages given above.

In a further development of the invention, the undulated wire is produced by passing the originally straight wire through at least two mating gears. In this simple way, continuous production of undulated wire is possible. Another embodiment of the method according to the invention provides for the coil to be produced in accordance with one or more of the methods disclosed herein or equivalents thereof. In this way the above-given advantages of the method according to the invention for producing a coil also come to bear.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
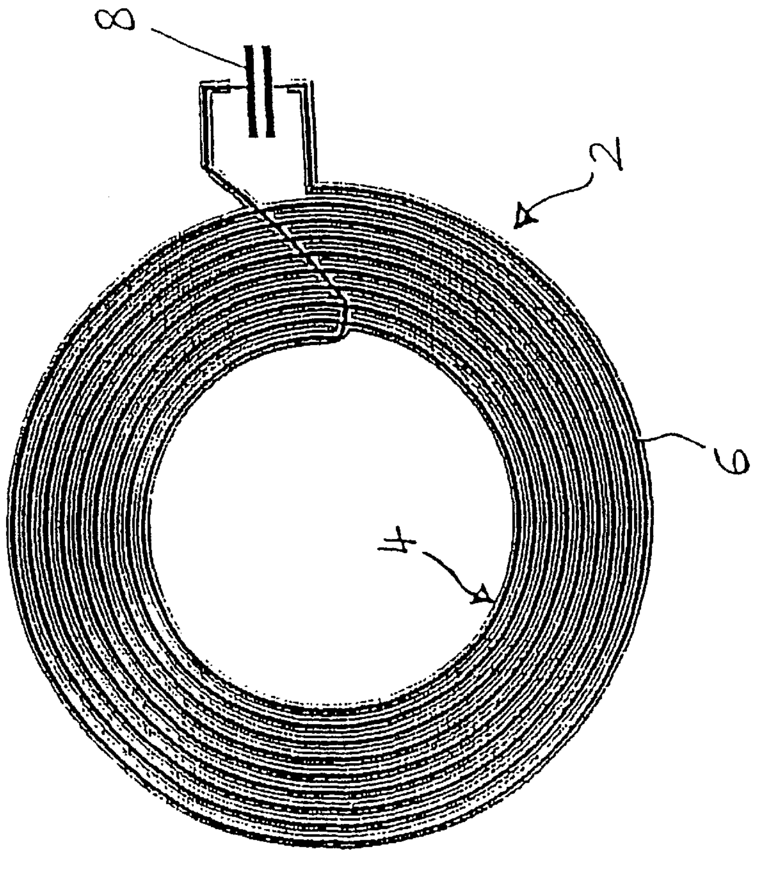
Fig. 1 PRIOR ART
FIG. 1 is a plan view of a conventional resonant circuit of an RF security element with a conventional coil and a conventional capacitor.

FIG. 1 depicts a conventional resonant circuit 2 of an RF security element with a spiral-wound coil 4 having several windings 6 and with a capacitor 8. The resonant frequency of the resonant circuit can be defined or set by suitably dimensioning the coil 4 and the capacitor 8. A disadvantage of this design is that the coil 4 must be made of wire with PVC or silk insulation to obtain a low-capacitance coil having a high electrical quality factor. This material is comparatively expensive, a fact which affects the production costs of the RF security element.

In addition, a commercially available capacitor 8 with a capacitance precisely fixed within relatively narrow tolerance limits must be used, since tolerances in the capacitance of the capacitor result in undesirable changes in the resonant frequency of the resonant circuit. Capacitors with the required precision must be pre-selected and are therefore comparatively expensive. Finally, the production process is complex, since different materials and components, which must be interconnected by crimping or soldering, must be used.

Figure 2:
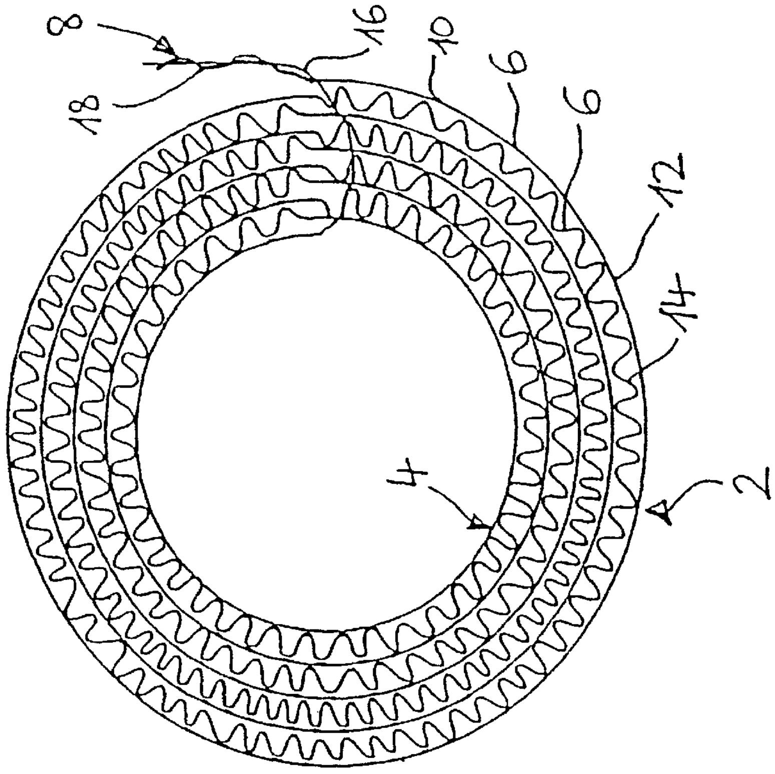
FIG. 2 is a plan view of a resonant circuit with a coil according to the invention and with a capacitor according to the invention.

FIG. 2 shows an embodiment of a coil 4 according to the invention, and of a capacitor 8 according to the invention. Both of the components forming the resonant circuit 2 are made from one piece of wire 10, which may be baked-enamel wire in one embodiment. The wire 10 does not require PCV or silk insulation. For this reason it is relatively inexpensive. This is especially true for baked-enamel wire.

The large mean distance between windings 6, which is required for the production of a low-capacitance, spiral-wound coil 4, is achieved in the coil 4 according to the invention in that, preferably, a winding of straight wire 12 is followed by a winding of undulated wire 14. This results in a large mean distance between the adjacent windings 12 and 14 and hence the desired low-capacitance coil 4, despite the possible contact between the wave valleys and peaks of the windings of undulated wire 14 and the adjacent winding of straight wire 12. FIG. 2 clearly reveals that not only the windings of straight wire 12, but also those of undulated wire 14 each cover an angle of $2\pi$. In this way a maximum mean distance between the windings is achieved and the properties of the resonant circuit 2 are further improved.

The capacitor 8 according to the invention is comprised of the ends 16 and 18 of the wire 10 from which the coil 4 was wound. The desired capacitance of the capacitor 8 is produced by intertwining the two wire ends 16 and 18. The more the wire ends 16 and 18 are twisted about one another, the greater is the capacitance of the capacitor 8 formed by the wire ends 16 and 18. This permits the resonant frequency of the resonant circuit 2 to be set at the desired value during the production process.

Figure 3:
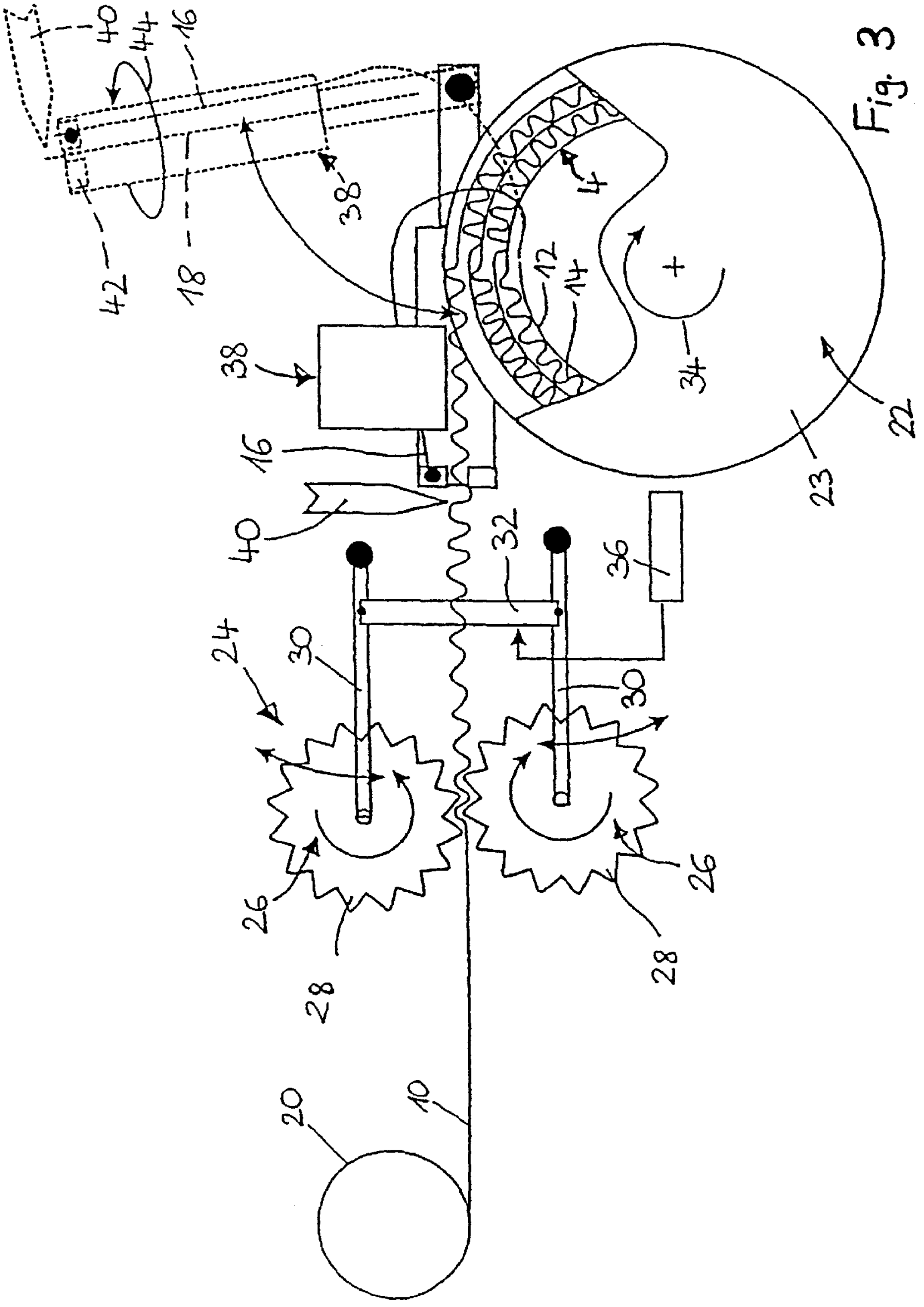
FIG. 3 is a schematic representation of an apparatus for the production of a coil according to the invention.

FIG. 3 represents a schematic drawing of an embodiment of an apparatus for the production of a coil 4 according to the invention. Wire 10 is unwound from a supply drum 20 and is wound onto a winding spindle 22. The winding spindle 22 is covered on the sides to prevent the wire 10 from laterally slipping off the winding spindle 22. A portion of the covering 23 shown in FIG. 3 is cut away to reveal the windings of straight wire 12 and those of undulated wire 14. A device 24 is provided between the supply drum 20 and the winding spindle 22, by which the wire 10 can be bent to an undulating shape. A major component of this embodiment 24 comprises two gears 26 with meshing teeth 28. The crest clearance and the backlash of the teeth 28 are such that the wire 10 is not crushed, nor is the insulation damaged by the teeth 28. The gears 26 are mounted to rotate on swivel levers 30. The mutual spacing of the gears can be altered through adjustment means 32, which may be of any suitable design, such as a telescoping, flexing, linkage-bending, or other variable length member. If a winding of straight wire 12 is to be wound onto the winding spindle 22, the spacing between the gears 26 is enlarged far enough to permit the wire 10 to be transported unhindered and without deformation through the gap between the gears 26. When a winding of straight wire 12 has been completed and the wire 10 is once more to be undulated, the distance between gears 26 is again reduced by the adjustment means 32 until an undulating deformation of the wire 10 occurs, but on the other hand no damage to the insulation of the wire 10 occurs. The adjustment of the distance between the gears 26 can also be performed in a different way, for instance by a linear guiding of the gears.

Since the length of the windings 12 and 14 increases as the diameter of the coil 4 grows, the adjustment means 32 must be controlled via the angle of rotation 34 of the winding spindle 22. An angle gauge 36 is suggested in FIG. 3. Gauge 36 detects the angle of rotation of the winding spindle 22 and actuates the adjustment means 32 accordingly, in such a manner that windings of straight wire 12 and windings of undulated wire 14 are alternately wound onto the winding spindle 22. Of course, a corresponding forward wind resulting from the spatial distance between the gears 26 and the winding spindle 22 must be taken into account in the control of the adjustment means 32.

On completion of the winding of the coil 4, the one wire end 16 of the coil 4 is clamped in a device for the production of a twisted wire capacitor 38. The other end is produced by cutting the wire 10 with a cutter 40 or the like. Subsequently, the device 38 swings into the position shown by dotted lines in FIG. 3, and the second end 18 of the wire is clamped between two jaws 42. Now, the device 38 begins to rotate, for instance in the direction of the arrow 44, and in this way to intertwine the wire ends 16 and 18 of the coil. As soon as the desired capacitance of the capacitor has been reached, which can be measured through the resonant frequency of the resonant circuit with the aid of a transmitter unit 50 and receiver unit 52 (see FIG. 4), the twisting is terminated and the resonant circuit, comprising a coil 4 according to the invention and a capacitor 8 according to the invention, is finished. Excess wire 10 at the wire ends 16 and 18 can be cut off with the cutter 40 or the like, if so desired.

Figure 4:
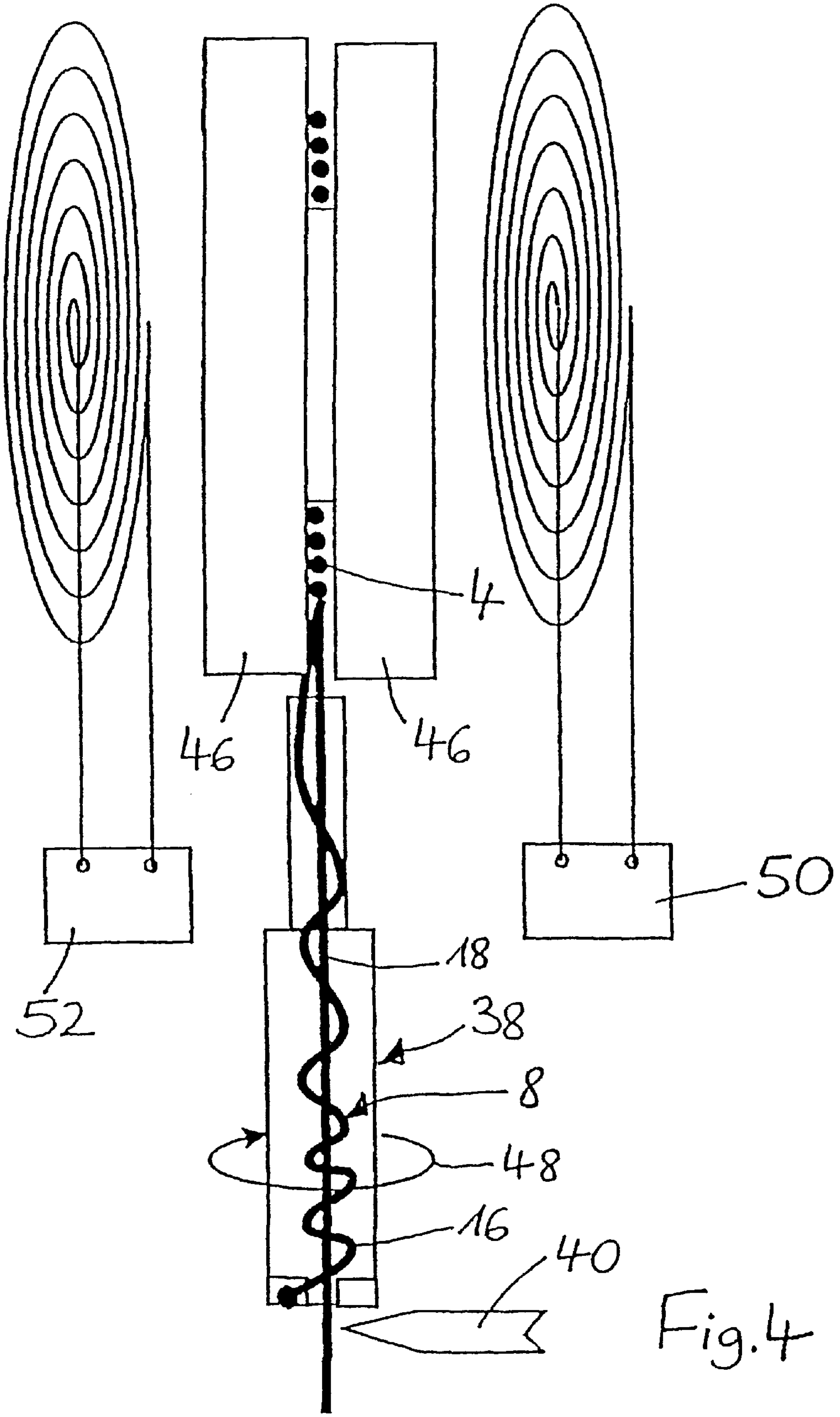
FIG. 4 is a schematic representation of an apparatus for the production of a capacitor according to the invention.

FIG. 4 shows a coil 4, clamped between two blocks 46, and a device 38 for the production of a twisted capacitor 8. During the rotation of the device 38 as indicated by the arrow 48, an alternating electromagnetic field is coupled via a transmitter unit 50 into the resonant circuit comprising the coil 4 and the capacitor 8. A receiver unit 52 receives the emitted alternating electromagnetic field and enables a continuous measurement of the resonant frequency during the twisting operation. When the desired resonant frequency has been reached, the twisting of the wire ends 16 and 18 can be terminated and the resonant circuit is finished. Finally, to clean up, any protruding wire can be cut off.

All features depicted in the description, the following claims and the drawings can be employed according to the invention either individually or in any combination with one another. The alternating winding of coil windings with straight and undulated wire can be replaced, if necessary, by winding several turns of straight wire followed by several turns of undulated wire and vice versa.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A coil for an RF security element having a capacitor, the coil comprising a spiral-wound coil (4) having at least two windings (6), wherein the coil comprises at least one winding of straight wire (12) and at least one winding of undulated wire (14).

2. The coil according to claim 1, wherein the coil comprises more than two windings (6) with the windings of straight wire (12) and the windings of undulated wire (14) alternating with one another.

3. The coil according to claim 2, wherein the at least one winding of undulated wire (14) has wave valleys and wave peaks, which are arranged immediately adjacent to a winding of straight wire (12).

4. The coil according to claim 1, wherein the undulated wire (14) has a series of shapes selected from the group consisting of triangular half-waves, sine half-waves and semicircular shapes.

5. The coil according to claim 1, wherein each winding of straight wire (12) and each winding of undulated wire (14) encloses an angle of $2\pi$.

6. The coil according to claim 1, wherein the coil (4) comprises baked-enamel wire.

7. An RF security element comprising a coil according to claim 1 and a capacitor (8), wherein the capacitor (8) comprises a first piece of wire (16) and a second piece of wire (18), with the first piece of wire (16) and the second piece of wire (18) being intertwined.

8. The RF security element according to claim 7, wherein one of the first piece of wire (16) and the second piece of wire (18) is wound about the respective other piece of wire (18, 16).

9. The RF security element according to claim 7, wherein the straight wire (12) and the undulated wire (14) are parts of a single piece of coil wire (10), and wherein the first piece of wire (16) is formed by a first end of the coil wire (10) and the second piece of wire (18) is formed by a second end of the coil wire (10).

10. The RF security element according to claim 7, wherein the capacitor (8) comprises baked-enamel wire.

11. A method for producing a spiral-wound coil (4) of an RF security element, comprising a step of: alternately winding at least one turn of straight wire (12) and at least one turn of undulated wire (14) onto a winding spindle (22).

12. The method according to claim 11, comprising a step of forming the undulated wire (14) by passing a portion of straight wire through at least two mating gears (26).

13. The method according to claim 12, comprising driving the mating gears (26) singly or synchronously.

14. The method according to claim 12, comprising controlling an axial spacing of the mating gears (26) based on an angle of rotation (34) of the winding spindle (22).

15. The method according to claim 11, wherein the straight wire (12) and the undulated wire (14) comprise baked-enamel wire, and heating the baked-enamel wire.

16. The method according to claim 15, wherein the baked-enamel wire is heated prior to the winding of the coil (4).

17. A method for producing a capacitor (8) of an RF security element having a wire coil (4), the wire coil having a first piece of wire (16) on a first end of the coil and a second piece of wire (18) on a second end of the coil, comprising the following method steps:

(a) clamping the first piece of wire (16) in a rotary device (38) along which the second piece of wire (18) runs during the winding;

(b) swiveling the rotary device (38) through an angle of approximately 90°;

(c) clamping the second piece of wire (18) in the rotary device (38); and (d) intertwining the first and second pieces of wire (16, 18) by rotating the rotary device (38) about an axis of rotation extending parallel to longitudinal axes of the first and second pieces of wire (16, 18).

18. The method according to claim 17, further comprising the steps of measuring a resonant frequency of a resonant circuit (2) of the RF security element during the intertwining step, and terminating the intertwining step when a certain resonant frequency is reached.

19. The method according to claim 17, further comprising cutting off protruding wire ends after production of the capacitor (8).

20. The method according to claim 17, comprising the a step of forming the coil (4) by alternately winding at least one turn of straight wire (12) and at least one turn of undulated wire (14) onto a winding spindle (22).

* * * * *